United States Patent [19]
Smith

[11] Patent Number: 5,825,678
[45] Date of Patent: Oct. 20, 1998

[54] METHOD AND APPARATUS FOR DETERMINING FLOATING POINT DATA CLASS

[75] Inventor: Ronald M. Smith, Wrappingers Falls, N.Y.

[73] Assignee: International Business Machines Corporation, Armonk, N.Y.

[21] Appl. No.: 414,858

[22] Filed: Mar. 31, 1995

[51] Int. Cl.⁶ .............................. G06F 7/38; G06F 7/00; G06F 15/00; H03M 7/00

[52] U.S. Cl. ................. 364/748; 364/715.03; 341/50; 341/94

[58] Field of Search .................... 364/748, 715.03; 341/50, 89, 104, 105, 94; 395/375, 800

[56] References Cited

U.S. PATENT DOCUMENTS

| | | | |
|---|---|---|---|
| 4,325,120 | 4/1982 | Colley et al. | 395/412 |
| 4,707,783 | 11/1987 | Lee et al. | 395/375 |
| 4,831,575 | 5/1989 | Kuroda | 364/748 |
| 5,191,335 | 3/1993 | Leitherer | 341/94 |

*Primary Examiner*—Reba I. Elmore
*Assistant Examiner*—Emmanuel L. Moise
*Attorney, Agent, or Firm*—Lynn Augspurger, Esq.; Morgan & Finnegan, LLP

[57] ABSTRACT

A new Test FP Data Class operation is provided which utilizes a 12-bit mask to determine to which of the 12 possible data classes a floating point number belongs and sets a condition code accordingly. As preferably embodied, a typical IBM System 390 instruction format is adapted to implement a Test FP Data Class operation. The class and sign of the first operand are examined to select one bit from the second-operand address. A condition code of 0 or 1 is set according to whether the selected bit is 0 or 1. The second-operand address is not used to address data; instead, individual bits of the address are used to specify the applicable combinations of operand calls and sign.

12 Claims, 6 Drawing Sheets

| BYTE | BITS | VALUE | FUNCTION |
|---|---|---|---|
| 0 | 0<br>1<br>2<br>3<br>4<br>5-7 | | BFP-INVALID-DATA MASK<br>BFP-DIVISION-BY-ZERO MASK<br>BFP-OVERFLOW MASK<br>BFP-UNDERFLOW MASK<br>BFP-INEXACT MASK<br>(UNASSIGNED) |
| 1 | 0<br>1<br>2<br>3<br>4<br>5-7 | | BFP-INVALID-DATA FLAG<br>BFP-DIVISION-BY-ZERO FLAG<br>BFP-OVERFLOW FLAG<br>BFP-UNDERFLOW FLAG<br>BFP-INEXACT FLAG<br>(UNASSIGNED) |
| 2 | 0-7 | | DATA-EXCEPTION CODE (DXC) |
| 3 | 0<br>1-5<br>6-7<br><br><br><br> | <br><br><br>00<br>01<br>10<br>11 | QNaN MODE<br>(UNASSIGNED)<br>ROUNDING MODE<br>    ROUND TO NEAREST<br>    ROUND TO ZERO<br>    ROUND UP<br>    ROUND DOWN |

FIG.4

| ENTITY | SIGN | BIASED EXPONENT | UNIT BIT* | FRACTION |
|---|---|---|---|---|
| TRUE ZERO | ± | 0 | 0 | 0 |
| DENORMALIZED NUMBERS | ± | 0** | 0 | NOT 0 |
| NORMALIZED NUMBERS | ± | NOT 0, NOT ALL ONES | 1 | ANY |
| INFINITY | ± | ALL ONES | - | 0 |
| QUIET NaN | ± | ALL ONES | - | F0=1, Fr=ANY |
| SIGNALING NaN | ± | ALL ONES | - | F0=0, Fr≠0 |

EXPLANATION:

\*    THE UNIT BIT IS IMPLIED

\*\*   THE BIASED EXPONENT IS TREATED ARITHMETICALLY AS IF IT HAD THE VALUE ONE

NaN   NOT A NUMBER

F0    LEFTMOST BIT OF FRACTION

Fr    REMAINING BITS OF FRACTION

FIG.6

| BFP OPERAND CLASS | BIT USED WHEN SIGN IS | |
|---|---|---|
| | + | − |
| ZERO | 20 | 21 |
| NORMALIZED NUMBER | 22 | 23 |
| DENORMALIZED NUMBER | 24 | 25 |
| INFINITY | 26 | 27 |
| QUIET NaN | 28 | 29 |
| SIGNALING NaN | 30 | 31 |

METHOD AND APPARATUS FOR DETERMINING FLOATING POINT DATA CLASS

BACKGROUND OF THE INVENTION

The present invention is directed to computer architecture. More particularly, the present invention is directed to computer architecture implementing floating point operations.

The present application generally relies upon the following as background in describing the invention and the prior art:

"Enterprise Systems Architecture/390 Principles of operation" (1994), Order No. SA22-7201-02, available from International Business Machines Corporation of Armonk, N.Y.;

"IEEE standard for binary floating-point arithmetic, ANSI/IEEE Std 754–1985" (August 1985), available from The Institute of Electrical and Electronic Engineers, Inc., New York, New York; and U.S. patent application Ser. No. 08/414,866 entitled "Implementation of Binary Floating Point Using Hexadecimal Floating Point Unit" filed on Mar. 31, 1995, in the name of Eric Mark Schwarz, et al., and assigned to International Business Machines Corporation of Armonk, N.Y.

The descriptions in the foregoing references are incorporated herein in their entirety by reference.

Although previous hardware implementations of floating-point arithmetic have provided various radixes, including binary, decimal, or hexadecimal, only a single radix was supported in any particular implementation. As future machines are built, however, they must be compatible with previous machines and must also provide support for new formats. Thus, a new requirement emerges to provide hardware support for more than one format. In particular, there is a requirement to support both the IBM System/360 hexadecimal and the IEEE binary floating-point formats. This results in several unique problems which must be solved.

Current instructions, such as Load And Test, which test the state of a floating point number, set the condition code to indicate the sign and value of the number. With IEEE floating-point numbers, there are 12 possible combinations of value and sign. This number of combinations, however, cannot be accommodated in the condition code of the program status word (PSW).

Accordingly, there is a need in the art for an operation that will provide more complete information on the data class of a floating point number.

SUMMARY OF THE INVENTION

With the foregoing in mind, it is an object of the invention to provide a new Test FP Data Class operation which utilizes a 12-bit mask to determine to which of the 12 possible data classes a floating point number belongs and sets the condition code accordingly.

As preferably embodied, a typical IBM System 390 instruction format is adapted to implement a Test FP Data Class operation. In the Test FP Data Class instruction, $R_1$ corresponds to the floating point register to be tested, and $B_2$ to the base and $D_2$ to the offset used to form the second operand address. The class and sign of the first operand ($R_1$) are examined to select one bit from the second-operand address ($D_2(B_2)$). A condition code of 0 or 1 is set according to whether the selected bit is 0 or 1.

The second-operand address is not used to address data; instead, individual bits of the address are used to specify the applicable combinations of operand calls and sign. In BFP mode, the rightmost 12 bits of the address, bits 20–31, are used to specify 12 combinations of operand class and sign; bits 0–19 of the second-operand class are ignored.

BRIEF DESCRIPTION OF THE DRAWINGS

The accompanying drawings, referred to herein and constituting a part hereof, illustrate preferred embodiments of the invention and, together with the description, serve to explain the principles of the invention, wherein:

FIG. 4 illustrates a floating-point-control register;

FIG. 6 shows the definition of each of the six classes of BFP data;

DETAILED DESCRIPTION OF THE INVENTION

Figure 1:
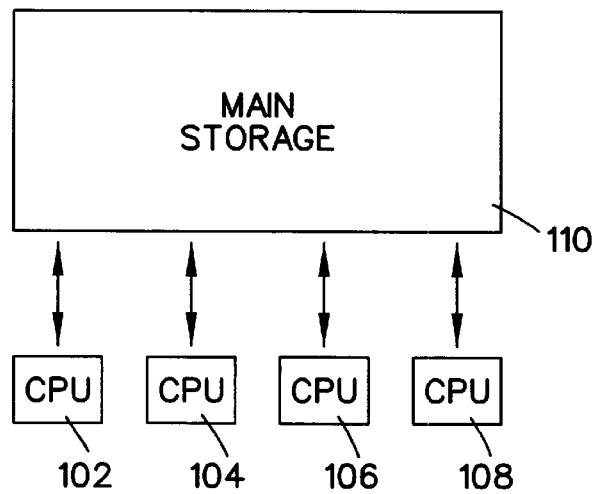
FIG. 1 illustrates a conventional shared memory computer system.

FIG. 1 illustrates a conventional shared memory computer system including a plurality of central processing units (CPUs) 102–108 all having access to a common main storage 110.

Figure 2:
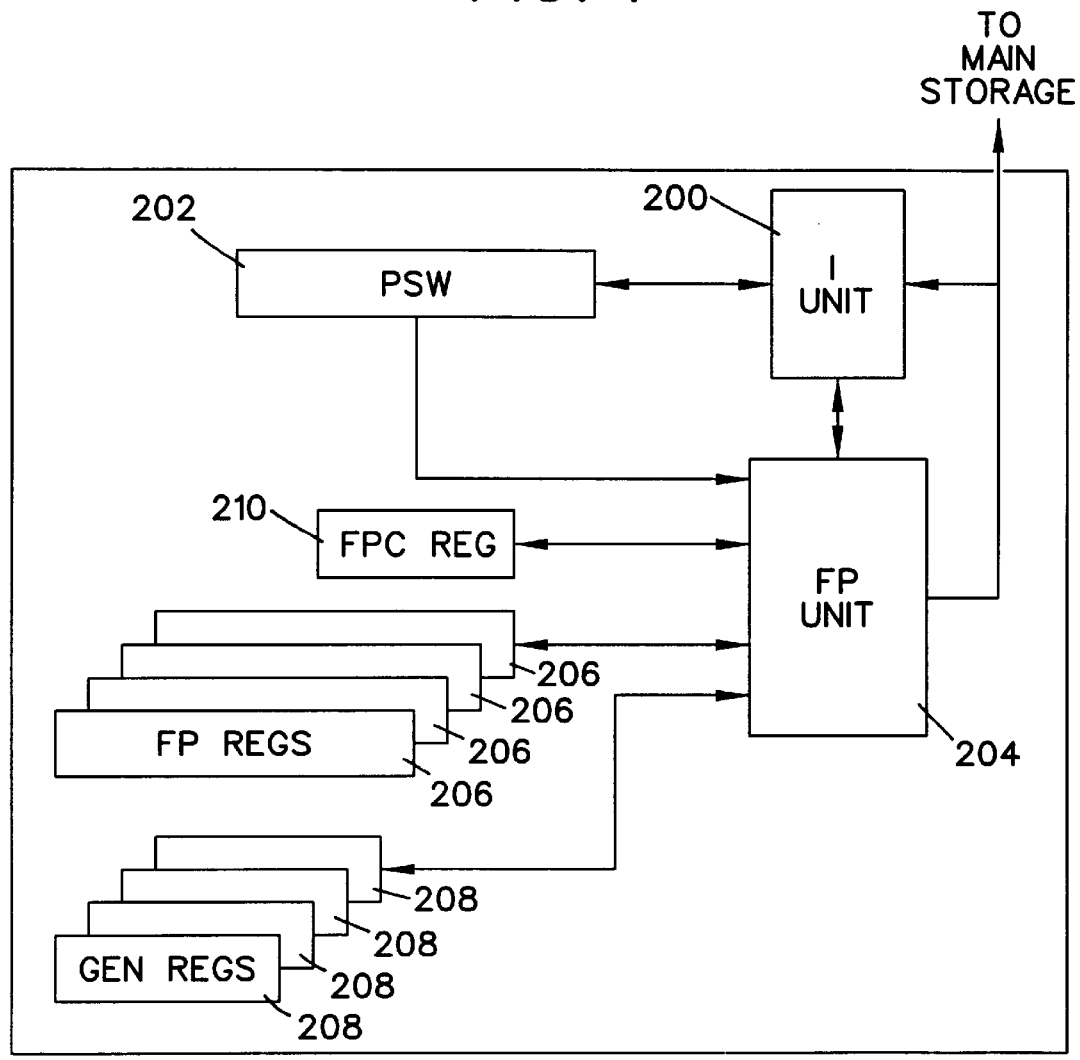
FIG. 2 illustrates functional components included in a CPU from FIG. 1.

FIG. 2 illustrates functional components included in a CPU from FIG. 1. Instruction unit 200 fetches instructions from common main storage 110 according to an instruction address located in the program status word (PSW) register 202, and appropriately effects execution of these instructions. Instruction unit 200 appropriately hands off retrieved floating point instructions to floating point unit 204, along with some of the operands that may be required by the floating point unit to execute the instruction. Floating point (FP) unit 204 includes all necessary hardware to execute the floating point instruction set, and preferably, in accordance with an embodiment of the present invention, supports both Binary and Hexadecimal floating point formats. FP unit 204 is coupled to floating point (FP) registers 206, which contain floating point operands and results associated with FP unit 204 processing, and is also coupled to general registers 208. FP unit 204 is also coupled to floating point control (FPC) register 210, which preferably includes mask bits in addition to those provided in the PSW. In a multi-user application, FPC register 210 is under control of the problem state program.

Figure 3:
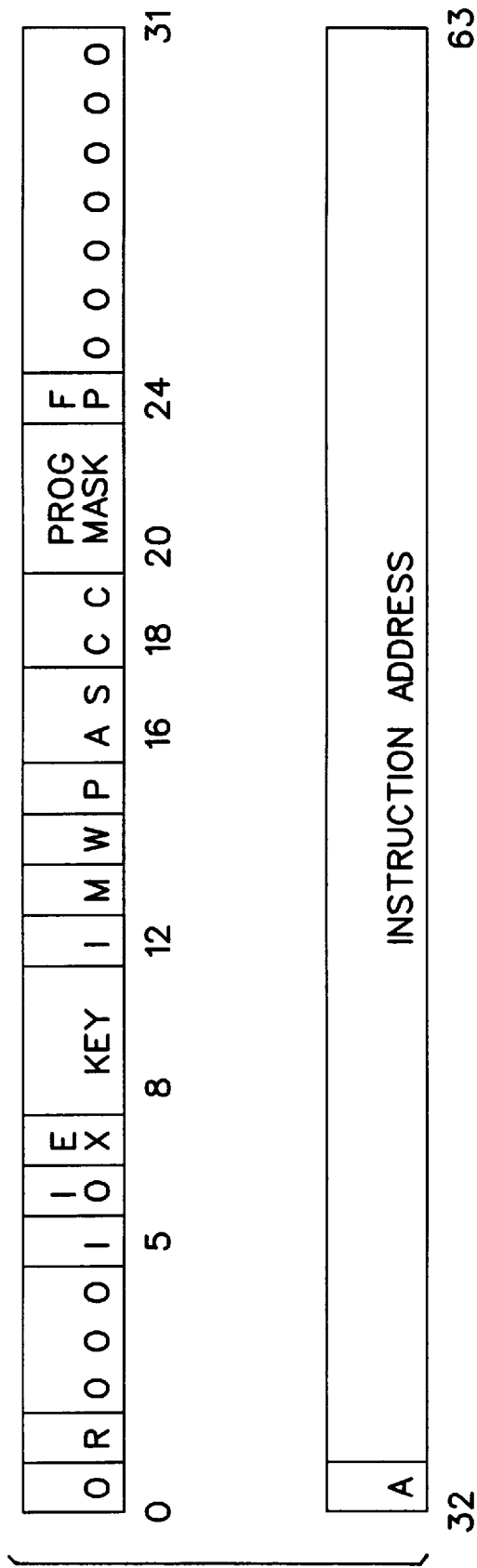
FIG. 3 illustrates the format of a 64 bit program status word.

FIG. 3 illustrates the format of a 64 bit PSW as stored in PSW register 202. In a multi-user application, the supervisor state program saves the PSW for a given problem state program when taking interruption to dispatch another problem state program. It can be seen that PSW includes program mask bits 20–23

Bit 24 of the PSW is the FP-mode bit. In accordance with an embodiment of the present invention whereby both binary and hexadecimal floating point modes are supported, when the bit is zero, the CPU is in the hexadecimal-floating-point (HFP) mode, and floating-point operands are interpreted according to the HFP format. When the bit is one, the CPU is in the binary-floating-point (BFP) mode, and floating-point operands are assumed to be in BFP format. Some floating-point instructions operate the same in either mode.

When an instruction is executed which is not available in the current FP mode, a special-operation exception is recognized.

As illustrated in FIG. 4, the floating-point-control (FPC) register 210 is a 32-bit register, which contains the mode (i.e., rounding mode), mask, flag, and code bits. For this implementation, by way of example, the rounding mode is represented by the last two bits o f the last byte. Round to nearest, round to zero, round up, and round down modes are supported.

Figure 5:
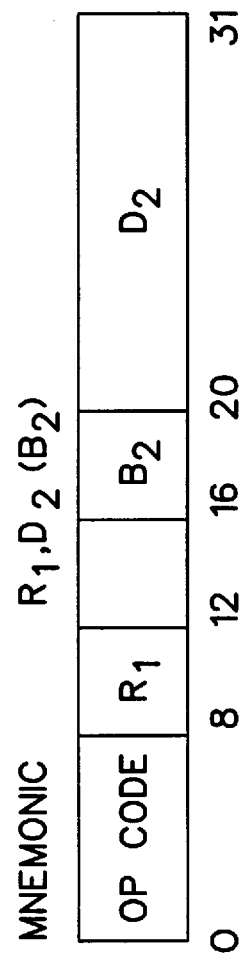
FIG. 5 illustrates a typical instruction format as is used, e.g., in an IBM System 390 computing system.

In FIG. 5 is illustrated a typical instruction format as is used, e.g., in an IBM System 390 computing system. As preferably embodied, this instruction format is adapted to implement the Test FP Data Class operation described herein. Further, three particular types of instructions for the Test FP Data Class operation may be implemented, i.e., mneumonics TCE, TCD, TCX corresponding to short, long, and extended operands, respectively. As adapted to the Test FP Data Class operation herein, $R_1$ designates the floating point register to be tested, and $B_2$ designates the base and $D_2$ is the offset used to form the second operand address. The class and sign of the first operand ($R_1$,) are examined to select one bit from the second-operand address ($D_2(B_2)$). Condition code 0 or 1 is set according to whether the selected bit is 0 or 1.

The second-operand address is not used to address data; instead, individual bits of the address are used to specify the applicable combinations of operand class and sign. In BFP mode, the rightmost 12 bits of the address, bits 20–31, are used to specify 12 combinations of operand class and sign; bits 0–19 of the second-operand class are ignored. Thus, as preferably embodied, $B_2$ may point to a general register which contains mask bits and $D_2$ would contain all zeros. Alternatively, when the $B_2$ field is all zeros, no base register is selected and $D_2$ may contain the mask bits. A third alternative where neither have all zeros is also possible, but not as practical.

Figures 7, 8:
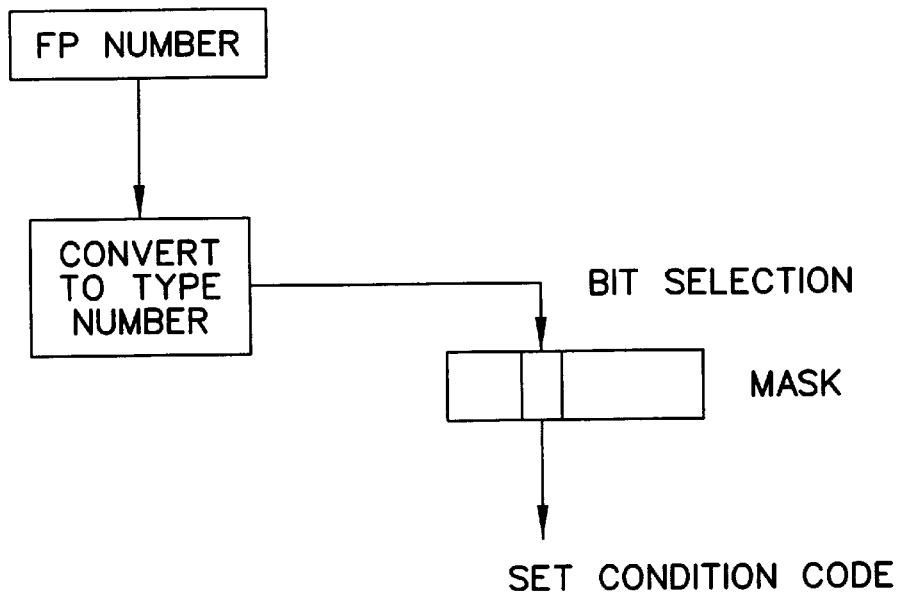
FIG. 7 illustrates the second operand address bits used for the Test FP Data Class operation in BFP mode.
FIG. 8 illustrates the execution of the Test FP Data Class operation.

FIG. 6 shows the definition of each of the six classes of BFP data including true zero, denormalized numbers, normalized numbers, infinity, quiet NaN, and signaling NaN. FIG. 7 illustrates the second operand address bits used for the Test FP Data Class operation in BFP mode.

In operation, a floating point processor conforming to IEEE standards provides an indication of the class of floating point number, which could be any one of the BFP data classes shown in FIG. 6. It may be appreciated that a program may want to know whether the floating point number is characterized by some combination of these BFP data classes. The Test FP Data Class operation provides the ability with one instruction to check all of the BFP data classes that the floating point number may fall into.

As illustrated in FIG. 8, a 12-bit mask is set, a bit corresponding to each of the possible classes and a particular bit is set to check for a particular data class. The floating point number in the floating point register that is pointed to by $R_1$ is loaded into the convert to type number logic and a determination is made as to the data class of the number. In the convert to type number logic, these floating point numbers are classified according to the sign, the fraction part, and the exponent part of the floating point number. That is, the floating point format has sign, exponent, and fraction bit. Based on these three bits, the floating point number may be categorized. Based upon the particular data class that it falls into, a signal is generated that will indicate one of the bits in the mask. That bit is then loaded into the condition code. That is, the condition code is set.

Figure 9:
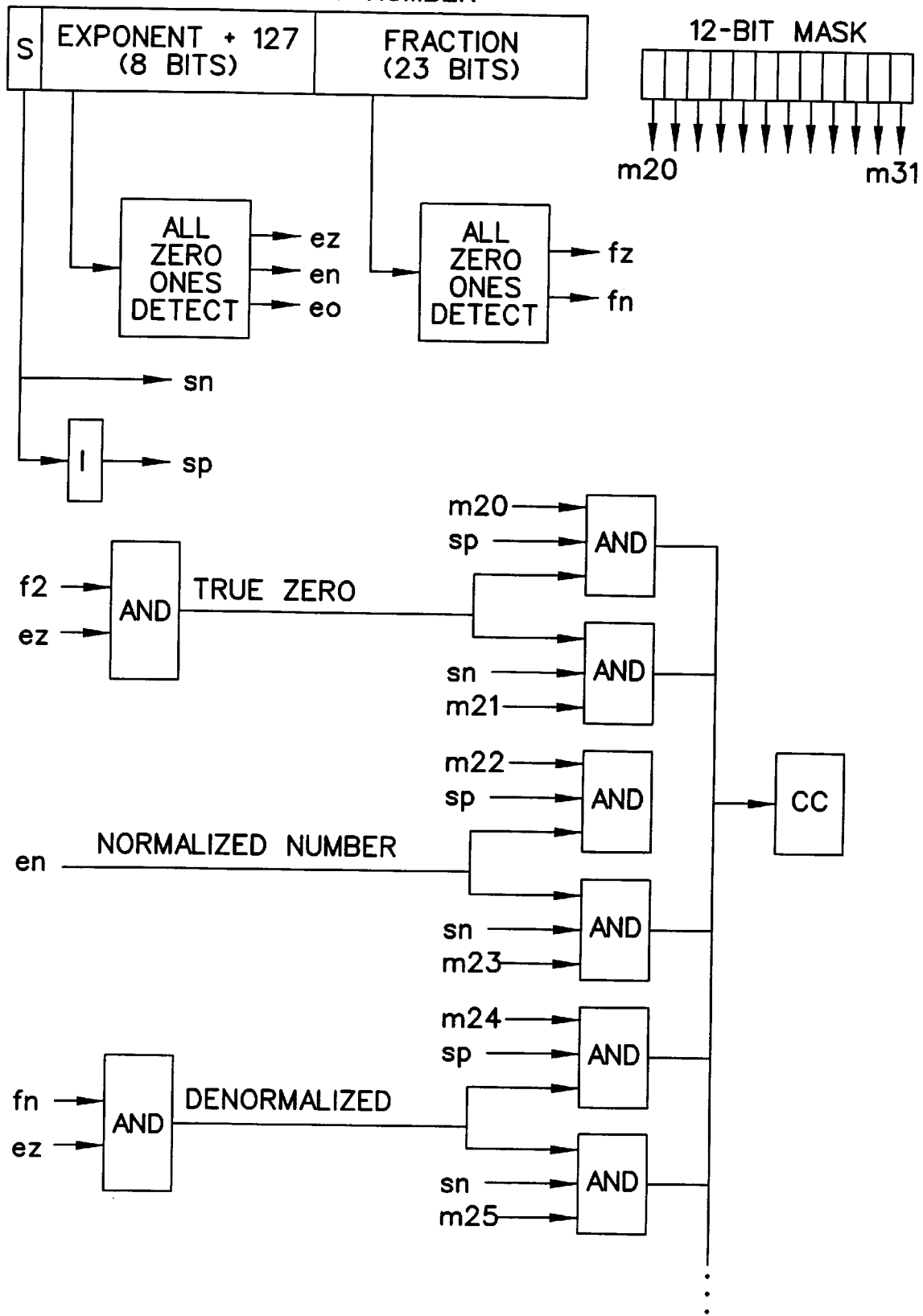
FIG. 9 illustrates the conversion circuitry of the convert to type number logic of the Test FP Data Class operation.

FIG. 9 illustrates the conversion circuitry of the convert to type number logic for bits 20 through 25 of the mask for the Test FP Data Class operation testing the short format (TCE). It will be appreciated that similar circuitry is used for bits 26 through 31 and for long (TCD) and extended (TCX) formats. In FIG. 9, the following abbreviations are used:

cc—condition code
en—exponent not zero and not all ones
eo—exponent all ones
ez—exponent zero
fn—fraction not zero
fz—fraction zero
sn—sign negative
sp—sign plus By way of example, if it was to be determined whether the number is positive zero, bit location 20 in the mask field would be set to 1. Then, if the floating point number were a positive zero the convert to type number logic would cause the mask bit 1 to be loaded into the condition code storage location. If a positive zero is not to be tested, a 0 would be set in bit location 20 in the mask field and the 0 would be loaded into the condition code storage location.

In view of the foregoing, it may be appreciated that by simply checking one bit in the PSW, namely the condition code, any combination of the twelve data classes that the floating point number might fall into may be determined.

It may be further appreciated that more of the second-operand-address bits may be set to one. If the second-operand-address bit corresponding to the class and sign of the first operand is one, condition code 1 is set; otherwise, condition code 0 is set.

It may be further appreciated that operands, including signaling NaNs and quiet NaNs, may be examined without causing an arithmetic exception.

It may be further appreciated that the Test FP Data Class operation provides a way to test an operand without risk of an exception or setting BFP flags.

It may be further appreciated that the second-operand-address bits assigned for zero and normalized numbers are the same in the HFP and BFP modes. Thus, programs which use the Test FP Data Class operation to test only for these operand classes may be written in a mode-independent manner.

While the invention has been described in its preferred embodiments, it is to be understood that the words which have been used are words of description, rather than limitation, and that changes may be made within the purview of the appended claims without departing from the true scope and spirit of the invention in its broader aspects.

What is claimed:

1. An apparatus for determining floating point data class, comprising:

a floating point processor for interpreting a machine instruction to determine whether the data class of a floating point number is an identified data class;

means for retrieving the floating point number from memory;

means for determining whether the data class of the floating point number is the identified data class by examination of condition of the fields of the floating point number; and means for setting a condition code in a program status word based upon the determination of whether the data class is the identified data class.

2. An apparatus for determining floating point data class in accordance with claim 1, wherein said means for determining uses a bit mask to determine action to be taken for a particular data class of the floating point number.

3. An apparatus for determining floating point data class in accordance with claim 2, wherein said machine instruction includes the location of said floating point number in memory and said bit mask.

4. An apparatus for determining floating point data class in accordance with claim 1, wherein said means for determining operates in a mode independent manner.

5. An apparatus for determining floating point data class in accordance with claim 1, wherein said machine instruction can accommodate floating point numbers having a short, long, or extended operand.

6. An apparatus according to claim 1, wherein said identified data class includes any specified combination of a plurality of possible data classes.

7. A method for determining floating point data class, comprising the steps of:

interpreting a machine instruction to determine whether the data class of a floating point number is an identified data class;

retrieving the floating point number from memory;

determining whether the data class of the floating point number is the identified data class by examination of condition of the fields of the floating point number; and setting a condition code in a program status word based upon the determination of whether the data class is the identified data class.

8. A method for determining floating point data class in accordance with claim 7, wherein said step of determining further comprises the step of using a bit mask to determine action to be taken for a particular data class of the floating point number.

9. A method for determining floating point data class in accordance with claim 8, further comprising the step of utilizing a machine instruction including location of the floating point number in memory and the bit mask.

10. A method for determining floating point data class in accordance with claim 7, wherein said step of determining is accomplished in a mode independent manner.

11. A method for determining floating point data class in accordance with claim 7, further comprising the step of using a machine instruction accommodating floating point numbers having a short, long, or extended operand.

12. A method according to claim 7, wherein said identified data class includes any specified combination of a plurality of possible data classes.

* * * * *